United States Patent [19]
Moriya et al.

[11] 4,345,780
[45] Aug. 24, 1982

[54] AUTOMATIC SEATBELT SYSTEM

[75] Inventors: Shigeru Moriya; Hisashi Ogawa; Mitsuaki Katsono, all of Toyota, Japan

[73] Assignee: Toyota Jidosha Kogyo Kabushiki Kaisha, Toyota, Japan

[21] Appl. No.: 148,037

[22] Filed: May 8, 1980

[30] Foreign Application Priority Data

Jul. 4, 1979 [JP] Japan .................. 54-93014[U]

[51] Int. Cl.³ .............................................. B60R 21/02
[52] U.S. Cl. .............................. 280/802; 280/807; 280/808; 297/467
[58] Field of Search ............ 280/802, 803, 804, 807, 280/808; 297/467, 469

[56] References Cited
U.S. PATENT DOCUMENTS

4,213,637 7/1980 Mauron ...................... 280/803
4,262,933 4/1981 Fox ............................. 280/802

*Primary Examiner*—Joseph F. Peters, Jr.
*Assistant Examiner*—John A. Carroll
*Attorney, Agent, or Firm*—Stevens, Davis, Miller & Mosher

[57] ABSTRACT

When leaving a vehicle, an occupant turns forwardly in the vehicle a guide lever, through which extends a webbing, one end of which is engaged with a vehicle door and the other end of which is wound up into a retractor provided at the substantially central portion of the vehicle, to thereby enlarge a space formed between the webbing and a seat. This release lever is locked in a condition of being turned forwardly in the vehicle. However, the release lever is unlocked after the occupant enters the vehicle and before the vehicle enters the normal running condition, thereby enabling to bring the occupant into a suitable seatbelt fastened condition.

11 Claims, 15 Drawing Figures

AUTOMATIC SEATBELT SYSTEM

BACKGROUND OF THE INVENTION

1. Field of the Invention

This invention relates to an automatic seatbelt system for automatically fastening a seatbelt system for protecting an occupant.

2. Description of the Prior Art

Seatbelt systems are adapted to restrain and protect the occupant at the time of collision of a vehicle. However, for reasons such as troublesome process of fastening the restraining webbing, the rate of wearers of the webbings is very low. Thus, there have been proposed automatic seatbelt systems capable of automatically fastening the restraining webbing to the occupant after he has entered the vehicle.

Among those automatic seatbelt systems, such a seatbelt system that the webbing is suspendedly extended from a vehicle door for entering or leaving the vehicle to the substantially central portion of the vehicle through about an occupant's seat has been highly evaluated because of the low costs in manufacture and reliable operation thereof. In the automatic seatbelt system of the type described above, one end of the webbing, the other end of which is engaged with the door, is wound up into a retractor, which is provided adjacent a tunnel portion formed at the substantially central portion of the vehicle, whereby the webbing is wound off from the retractor and, when the door is opened, the intermediate portion of the webbing is adapted to form a space for the occupant to enter or leave the vehicle between itself and the occupant's seat in accordance with a circular arcuate opening motion of the door.

However, with the automatic seatbelt system as described above, when the occupant leaves the vehicle, the intermediate portion of the webbing moves toward the door while being wound off from the retractor during the opening motion of the door, whereby this moving webbing slides on the chest of the occupant seated, thereby presenting such disadvantages that an uncomfortable feeling is given to the occupant and the sliding webbing causes a necktie pin, fountain pen, ballpoint pen or the like attached onto the occupant's clothes to fall off therefrom.

SUMMARY OF THE INVENTION

This invention has been developed to obviate the abovedescribed problems of the prior art, and has as its object the provision of an automatic seatbelt system wherein the intermediate portion of the moving webbing does not slide on the chest of the occupant, when the occupant enters or leaves the vehicle, and very comfortable actions of entering or leaving the vehicle can be made.

The automatic seatbelt system according to the present invention is of such an arrangement that a guide lever provided at one side of the occupant's seat can be turned back and forth in the vehicle, the intermediate portion of the webbing inserted through a guide loop formed at the forward end of this guide lever is turned forwardly in the vehicle by manual operation of the occupant to be locked, whereby the intermediate portion of the webbing is separated from the chest of the occupant to secure a satisfactory space for entering or leaving the vehicle, after the occupant has entered the vehicle, the locking condition is automatically released before the vehicle enters the normal running condition, and the guide lever is turned rearwardly in the vehicle to give a suitable webbing fastening condition to the occupant.

Description will hereunder be given of an embodiment of the present invention with reference to the drawings.

DESCRIPTION OF THE PREFERRED EMBODIMENT

Figure 1:
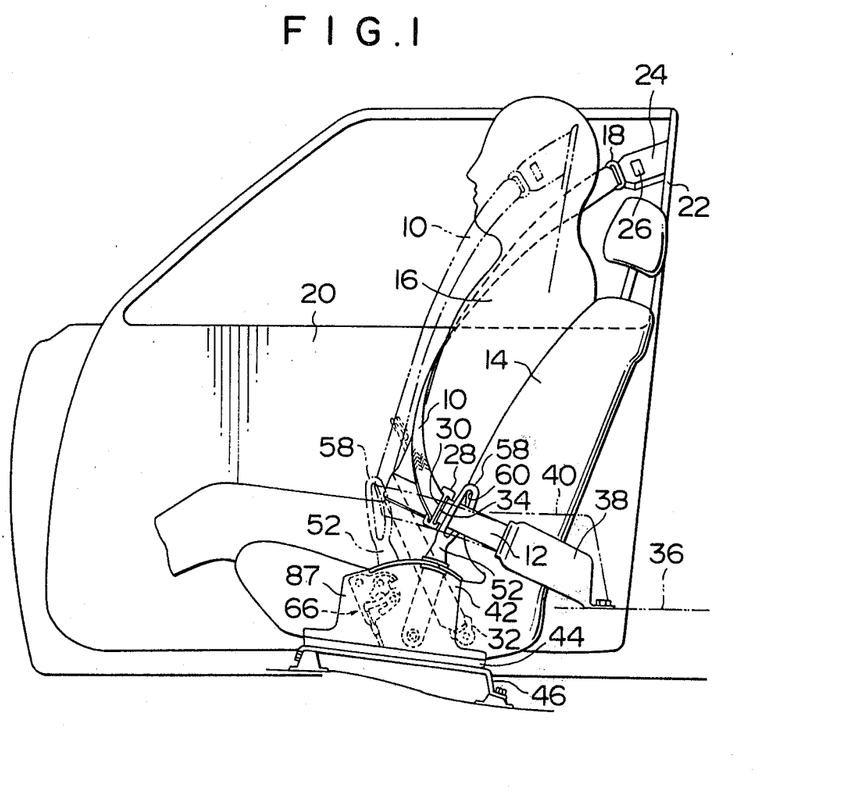
FIG. 1 is a side view showing a first embodiment of the automatic seatbelt system according to the present invention.
Figure 2:
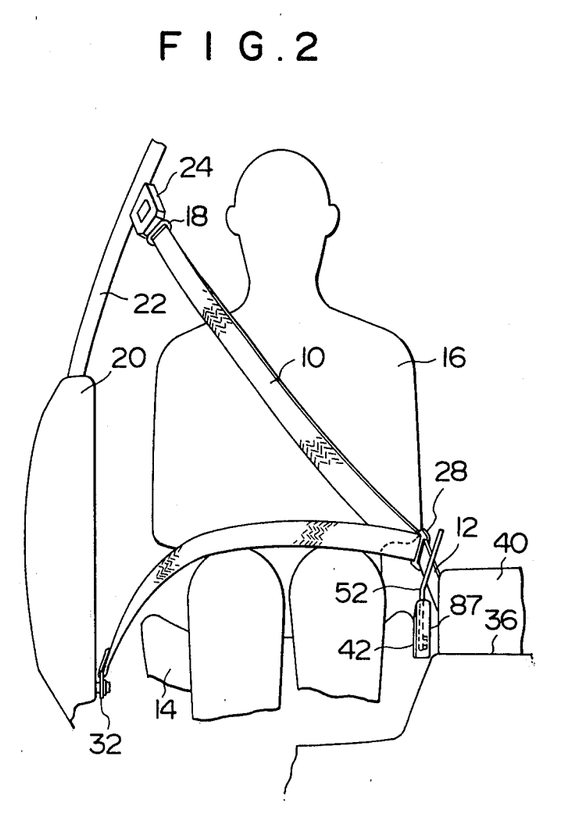
FIG. 2 is a front view of the first embodiment.

FIGS. 1 and 2 show the first embodiment of the present invention, in which webbings 10, 12 are fastened to an occupant 16 seated at an occupant's seat 14 to form a three-point type seatbelt fastening condition.

Secured to one end of the webbing 10 is a tongue plate 18, which is engaged with a buckle device 24 solidly secured to a door frame 22 of a door 20 for entering or leaving the vehicle. This tongue plate 18 is caused to readily fall off by pressing a release button 26 of the buckle device 24, to thereby be disengaged from the buckle device. Furthermore, the intermediate portion of the webbing 10 is turned back at a slot 30 of a slip ring 28, and an anchor plate 32 secured to the other end of the webbing 10 is engaged with the lower end portion of the door 20.

On the other hand, the forward end of the webbing 12 is engaged with a slot 34 of the slip ring 28, and the base portion thereof is wound up into a retractor 38 solidly secured to a tunnel portion 36 provided at the substantially central portion of the vehicle. This retractor 38, in normal running condition of the vehicle, can wind off the webbing 12 against the windup biasing force, however, in an emergency of the vehicle, an inertia lock mechanism, not shown, operates to instantly stop the windoff of the webbing 12, to thereby secure the occupant in a reliably restrained condition. This retractor 38 is incorporated in a console box 40 provided on the tunnel portion 36.

With the arrangement of the webbings 10, 12 as described above, the opening of the door 20 by the occupant causes the opposite ends of the webbing 10 to move forwardly in the vehicle in accordance with an opening circularly arcuate motion of the door, whereby the webbing 10 is wound off from the retractor 38, so that a space for the occupant to enter or leave the vehicle can be formed between the webbings 10, 12 and the occupant's seat (see the position indicated by two-dot chain lines in FIG. 1). The closing of the door by the occupant after the occupant has entered the vehicle causes the webbings 10, 12 to return to the position indicated by solid lines in FIG. 1, so that the webbings 10, 12 can be automatically fastened to the occupant.

Figure 3:
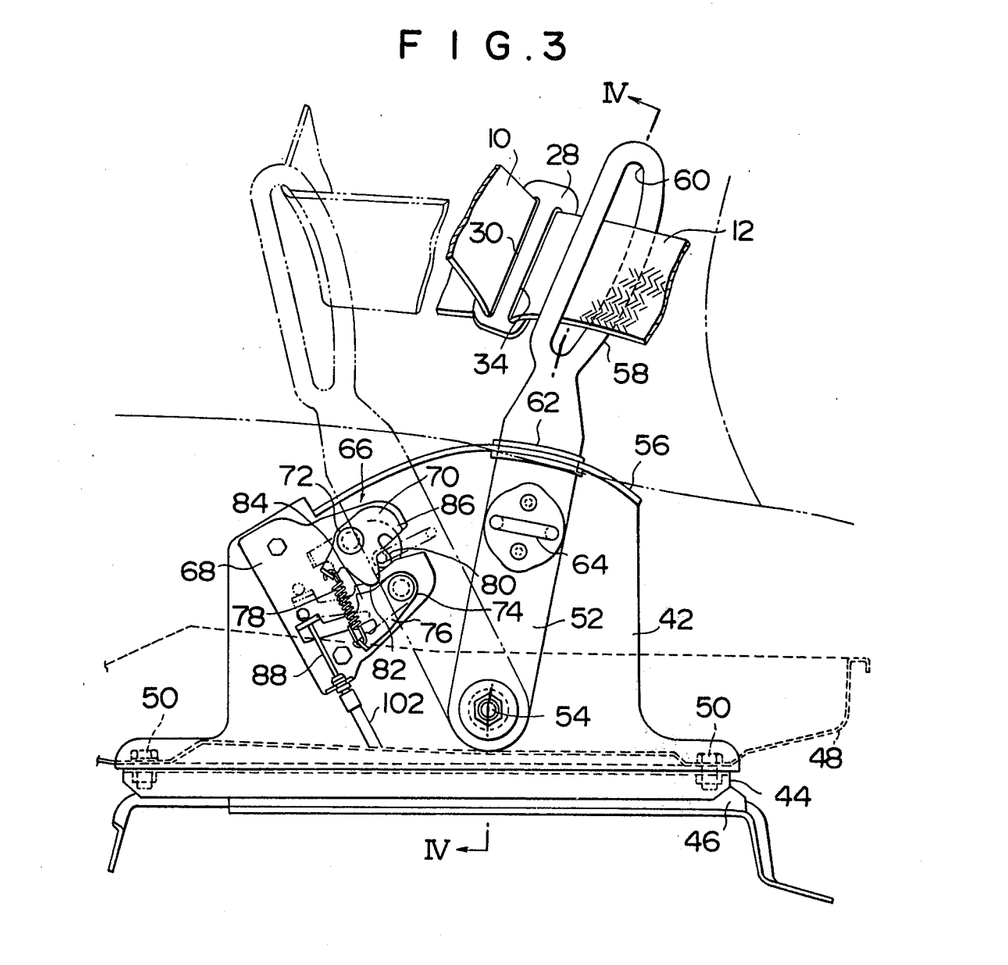
FIG. 3 is a partially sectional view of FIG. 1 with essential portions enlarged.
Figure 4:
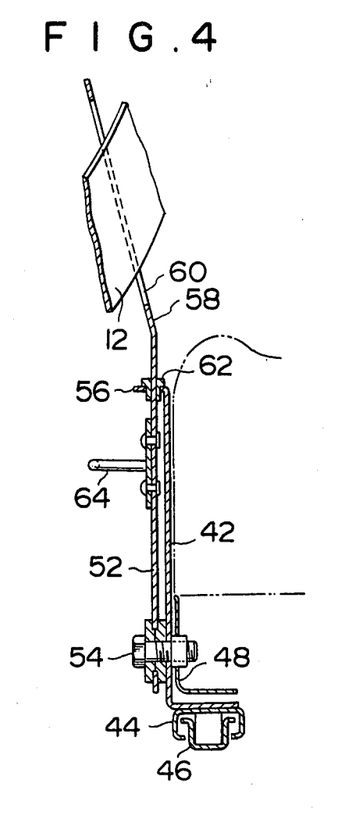
FIG. 4 is a sectional view taken along the line IV—IV in FIG. 3.

As shown in FIGS. 3 and 4, a bracket 42 is provided at the side surface of the occupant's seat on the center side of the vehicle. This bracket 42 is adapted to move back and forth in the vehicle together with the occupant's seat 14, when a seat track upper 44 secured to the seat 14 is moved back and forth in the vehicle with respect to a seat track lower 46 solidly secured to the vehicle body so as to adjust the seat 14 in the longitudinal direction of the vehicle. As shown in FIG. 4, this bracket 42 has a substantially letter 'L' shape as viewed in the longitudinal direction of the vehicle, and one side thereof is solidly secured to a seat frame 48 and the seat track upper 44 through a bolt 50 as shown in FIG. 3, whereby the other side thereof is substantially uprightly erected. A guide lever 52 is pivotally supported by a bolt 54 at the substantially central portion of this bracket 42, the intermediate portion of this guide lever 52 extends upwardly through a slot extending in the longitudinal direction of the vehicle in a guide portion integrally formed in the upper end portion of the bracket 42 and a webbing guide 58 is solidly secured to the upper end portion of the guide lever 52. This webbing guide 58 is penetratingly provided therein with a slot-like guide loop 60, through which passes the intermediate portion of the webbing 12.

Here, the bolt 54 of the guide lever 52 has an axis disposed in the lateral direction of the vehicle, with the result that, if the guide lever 52 is turned about this bolt 54, then the guide loop 60 moves in the longitudinal direction of the vehicle. In addition, at this time of movement, a shoe secured to the intermediate portion 45 of the guide lever 52 slides in the slot of the guide portion 56.

Solidly secured to the intermediate portion of the guide lever 52 is a substantially letter 'U' shaped striker 64, which, when the guide lever 52 is manually moved forwardly in the vehicle as indicated by two-dot chain lines in FIG. 3, meshes with a locking device 66 to thereby prevent the guide lever 52 from moving rearwardly in the vehicle. In the condition where the guide lever 52 is moved forwardly in the vehicle and locked, the intermediate portion of the webbing 12 is bent and moved forwardly in the vehicle as indicated by two-dot chain lines in FIG. 1, so that the space formed between the webbing 10, 12 and the seat 14 is enlarged so as to separate the webbings from the chest of the occupant 16.

The locking device 66 has a base plate 68 solidly secured to the bracket 42. A lock lever 70 is pivotally supported by this base plate 68 through a pin 72. Furthermore, a tension coil spring 78 is stretched between this lock lever 70 and a release lever 76 pivotally supported by the base plate 68 through a pin 74 in the vicinity of the lock lever 70, whereby the lock lever 70 is biased in the counterclockwise direction in FIG. 3, and the release lever 76 in the clockwise direction. A force receiving portion 80 of the lock lever 70 is disposed in the moving path of the striker 64 when the guide lever 52 turns, and when the guide lever 52 turns forwardly in the vehicle as indicated by two-dot chain lines in FIG. 3, the lock lever 70 is urged by the striker 64 to turn in the clockwise direction. With this turning, a projection 82 of the lock lever 70 engages a projection 84 of the release lever 76 to thereby lock the rotation of the lock lever 70 in the counterclockwise direction. In this locking condition, a projection 86 of the lock lever 70 enters into the striker 64 to lock the guide lever 52, whereby the guide lever 52 is prevented from moving rearwardly in the vehicle and retained as being turned forwardly in the vehicle. Additionally, the bracket 42 is provided with a dust cover 87 (see FIG. 1) for protecting the locking device 66.

Figure 5:
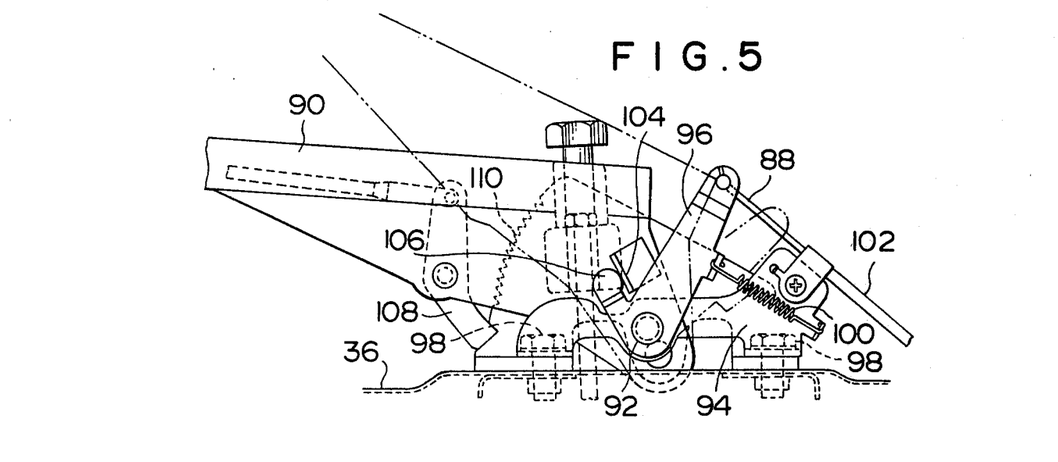
FIG. 5 is a side view showing the parking brake lever.

The release lever 76 is secured thereto with one end of a wire 88, the other end of which is engaged with a release lever 96 pivotally supported by a base plate 94 together with a pivot 92 of a parking brake lever 90 as shown in FIG. 5. Here, the base plate 94 is solidly secured to the tunnel portion 36 of the vehicle floor, and a tensile coil spring 100 is provided between the base plate 94 and the release lever 96 in a direction of decreasing the tension of the wire 88. Furthermore, a wire casing 102 is secured between the base plate 94 and the base plate 68 of the locking device 66 shown in FIG. 3, so that the wire 88 can be protected and, when the release lever 96 applies a tension to the wire 88, the release lever 76 as shown in FIG. 3 can be turned in the counterclockwise direction.

The parking brake lever 90 as shown in FIG. 5 is welded thereto with a letter 'L' shaped plate 104, which is relatively opposed to a projection 106 provided at a portion of the release lever 96.

The occupant, before leaving the vehicle, turns the parking brake lever 90 to bring same into a brake operating condition, i.e., the position indicated by two-dot chain lines in FIG. 5, and, after entering the vehicle, turns the parking brake lever 90 before the vehicle enters the normal running condition to the position indicated by two-dot chain lines in FIG. 5, i.e., the brake released condition. In the brake operating condition, a pawl 108 pivotally supported by the parking brake lever 90 meshes with a ratchet gear 110 to retain the brake operating condition.

Here, in the brake operating condition, the aforesaid letter 'L' shaped plate 104 can turn the release lever 96 in a direction of decreasing the tension of the wire 88, i.e., in the clockwise direction in FIG. 5, and, in the brake released condition, said letter 'L' shaped plate 104 urges a projection 106 of the release lever 96, whereby the release lever 96 is forcedly rotated in the counterclockwise direction in FIG. 5.

Description will hereunder be given of operation of the first embodiment with the arrangement as described above. FIGS. 1 and 2 show the normal running condition of the vehicle, in which the webbings 10, 12 have been automatically fastened to the occupant. In this normal running condition of the vehicle, the retractor 38, which has wound up the end portion of the webbing 12, allows the webbing 12 to be wound off, so that the occupant can change his driving posture. Furthermore, in an emergency of the vehicle, such as a collision, the retractor 38 prevents the webbing 12 from being wound off, so that the occupant can be reliably restrained by the webbings 10, 12, thereby enabling to secure him in safety. Additionally, after the completion of the collision, upon pressing the release button 26 to cause the tongue plate 18 to fall off from the buckle device 24, the occupant can open the door to escape from the vehicle to outside.

Description will hereunder be given of the case the occupant leaves the vehicle after the completion of the normal running of the vehicle. After stopping the running of the vehicle, the occupant turns the parking brake lever 90 as in the brake operating condition (as indicated by two-dot chain lines in FIG. 5), whereby the letter 'L' shaped plate 104 permits the release lever 96 to turn in the clockwise direction in FIG. 5 against the biasing force of the coil spring 100, so that the release lever 76 shown in FIG. 3 is turned by the biasing force of the coil spring 78 in the clockwise direction to cause the projection 84 to approach the projection 82 of the lock lever 70.

Here, if the occupant turns the guide lever 52 by manual operation forwardly in the vehicle, the striker 64 of the guide lever 52 abuts against the lock lever 70 of the locking device 66 to rotate same in the clockwise direction in FIG. 3, whereby the projection 82 of the lock lever 70 engages the projection 84 of the release lever 76 into a locked condition. In this condition, the projection 86 of the lock lever 70 holds the striker 64, so that the guide lever 52 is retained in the locked condition. With this arrangement, the guide loop 60 moves the intermediate portion of the webbing 12 forwardly in the vehicle, so that the space formed between the webbings 10, 12 and the occupant's seat can be enlarged.

Then, if the occupant open the door 20, the opposite ends of the webbings 10, 12 move forwardly in the vehicle in accordance with the opening circular arcuate motion of the door 20, whereby the webbing 12 is wound off from the retractor 38, a satisfactory space for leaving the vehicle is formed between the webbings 10, 12 and the occupant's seat, and the webbing fastened condition of the occupant is automatically released, so that the occupant can leave the vehicle. In this case, the guide lever 52 has been turned forwardly in the vehicle, whereby the webbings 10, 12 do not slide on the chest of the occupant while moving.

Description will hereunder be given of the case the occupant enters the vehicle again. If the occupant opens the door 20 to enter the vehicle, then a space for entering the vehicle is again formed between the webbings 10, 12 and the seat 14, so that the occupant can readily enter the vehicle. In this case, the guide lever 52 is still retained in the locked condition, i.e., at the position turned forwardly in the vehicle, whereby a satisfactory space for the occupant to enter the vehicle is secured, so that the occupant can very easily enter the vehicle. If the occupant closes the door 20 upon being seated, the opposite ends of the webbing 10 move again rearwardly in the vehicle, whereby the retractor 38 winds up the excessive portion of the webbing 12. However, in this condition, the guide lever 52 is locked at the forwardly moved position in the vehicle, whereby the webbings 10, 12 are slightly separated from the occupant. In this case, if the occupant, upon being seated, turns the parking brake lever 90 into the brake released condition, i.e., the position indicated by the solid lines in FIG. 5, then the letter 'L' shaped plate 104 turns the release lever 96 in the counterclockwise direction, whereby a tensile force is applied to the wire 88. The tensile force applied to this wire 88 turns the release lever 76 shown in FIG. 3 in the counterclockwise direction, whereby the projection 84 of the release lever 76 is disengaged from the projection 82 of the lock lever 70, so that the lock lever 70 can be turned in the counterclockwise direction to disengage the projection 86 from the striker 64. By this, the guide lever 52 is unlocked to be able to move rearwardly in the vehicle, whereby the windup biasing force of the webbing 12 through the action of the retractor 38 turns the guide lever 52 rearwardly in the vehicle through the guide loop 60, with the result that the webbings 10, 12 come into contact with the occupant 16 to automatically bring him into a three-point seatbelt fastened condition. In order to make the rearward movement of the guide lever 52 in the vehicle be reliable, a spring may be provided which can bias the guide lever 52 rearwardly in the vehicle.

Figure 6:
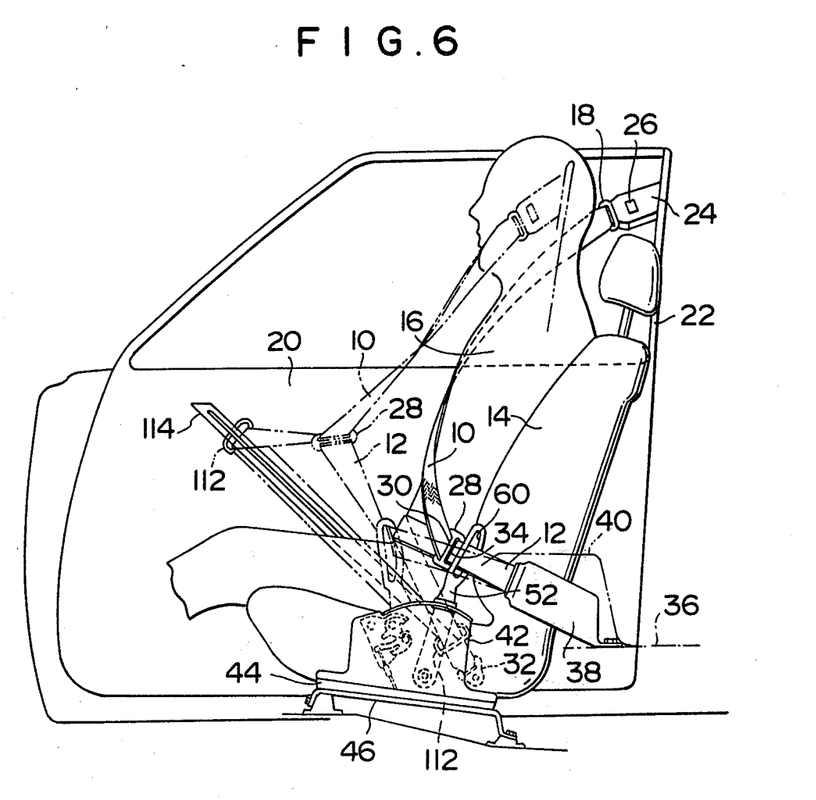
FIG. 6 is a side view showing a second embodiment of the present invention.
Figures 7, 9:
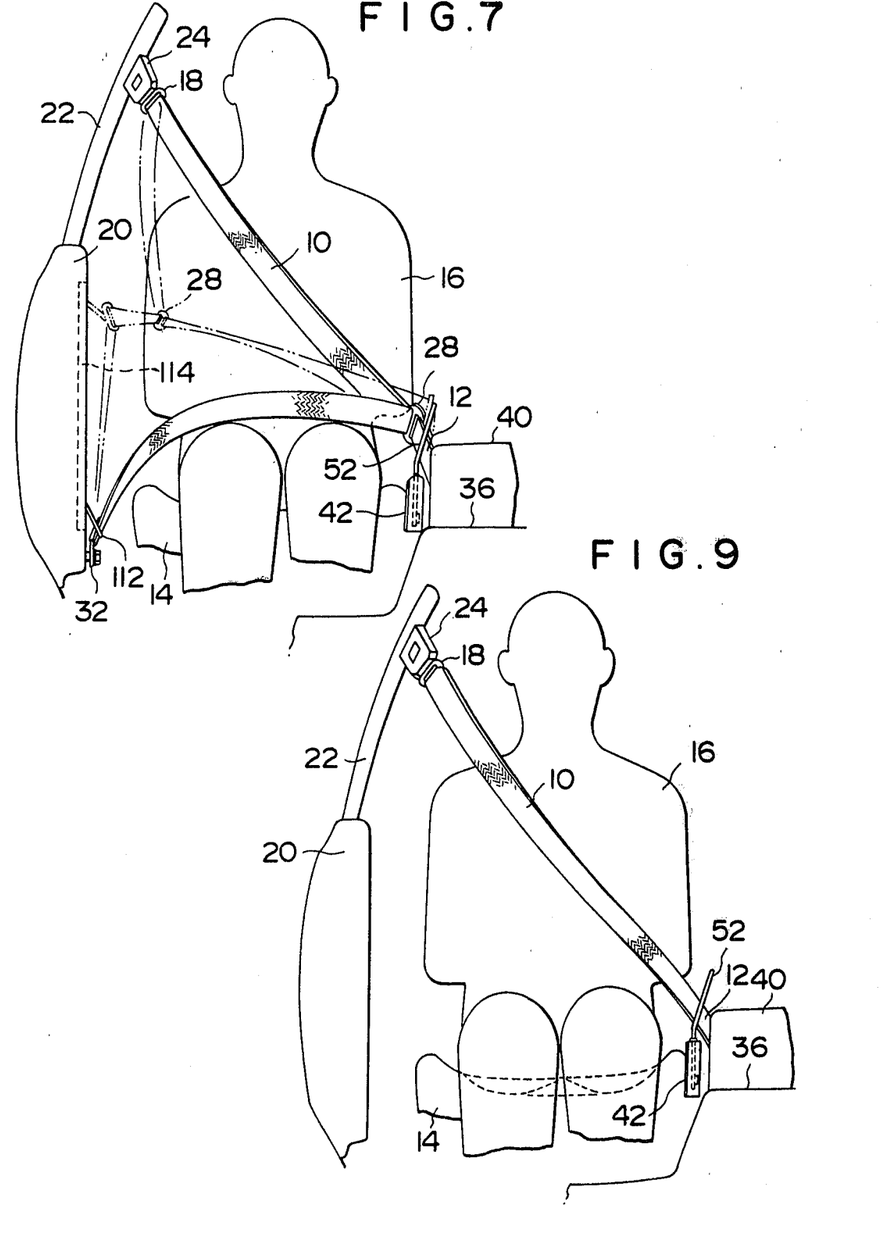
FIG. 7 is a front view showing the second embodiment.
FIG. 9 is a front view showing the third embodiment.

Next, FIGS. 6 and 7 show a second embodiment of the present invention, in which a guide 112 is slidably secured to the webbing 10 between the anchor plate 32 and the slip ring 28 in the longitudinal direction of the webbing 10. This guide 112 is movable from the upper forward portion of the door 20 to the lower rear position thereof along a guide rail 114 provided at the inner side of the door 20. Additionally, when the door 20 is opened, the guide 112 is moved by a drive means incorporated in the door 20 to a position forwardly and upwardly of the door 20, and, when the door is closed, the guide 112 is moved to a position rearwardly and downwardly of the door.

With this arrangement in this second embodiment, if the door 20 when the occupant enters or leaves the vehicle, a portion of the webbing 10 between the slip ring 28 and the anchor plate 32 is largely bent forwardly in the vehicle as indicated by the tow-dot chain lines in FIGS. 6 and 7, so that the actions of entering or leaving the vehicle made by the lower half of body of the occupant can readily effected.

Figure 8:
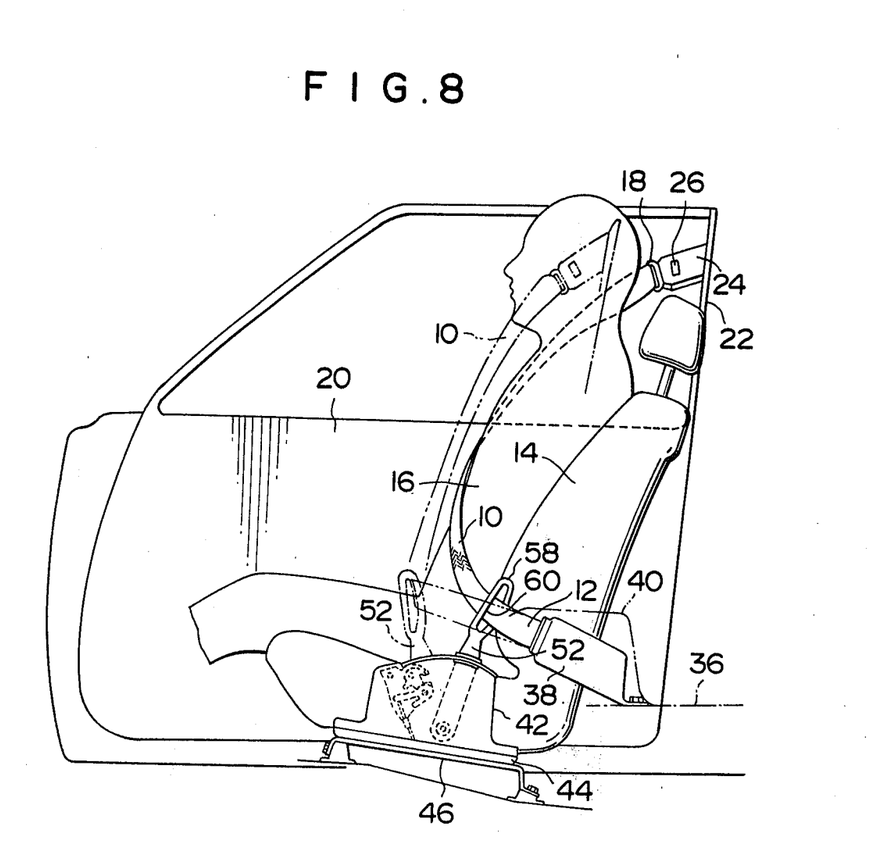
FIG. 8 is a side view showing a third embodiment of the present invention.

Next, FIGS. 8 and 9 show a third embodiment of the present invention, in which the webbings 10 and 12 are formed into an integral continuous webbing. Namely, one end of the webbing 10, the other end of which is engaged with the tongue plate 18, is integrally connected to the forward end of the webbing 12, and the intermediate portion of this webbing passes through the guide loop 60.

Consequently, in this third embodiment, the webbing is arranged to be in a two-point seatbelt fastened condition in which the chest of the occupant is obliquely restrained by the webbing. In this embodiment also, the movement of the guide lever 52 back and forth in the vehicle can offer the same advantages as in the preceding embodiments.

Figure 10:
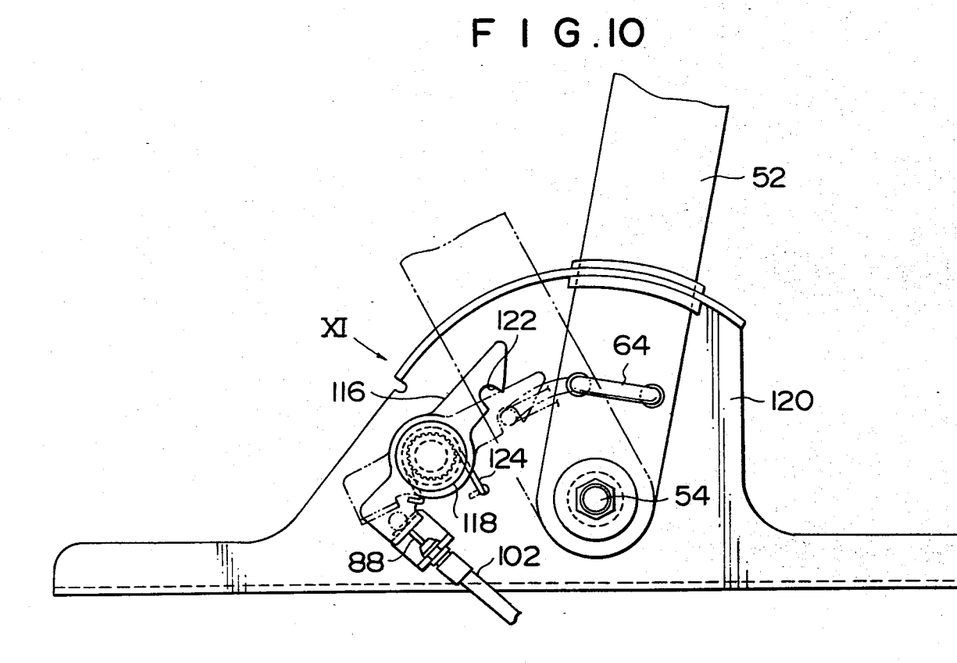
FIG. 10 is a side view showing the locking device in a fourth embodiment of the present invention.
Figure 11:
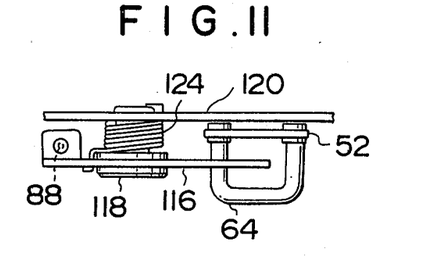
FIG. 11 is a view in the direction indicated by an arrow XI in FIG. 10.

FIGS. 10 and 11 show a fourth embodiment of the present invention, in which a lock lever 116 of the locking device additionally functions as a release lever.

More specifically, the lock lever 116 is pivotally supported at the intermediate portion thereof by a base plate 120 through a pin 118, formed at one end thereof with a cutout 122 for engaging the striker 64 if the guide lever 52, and engaged at the other end thereof with the wire 88. Further, this lock lever 116 is securedly provided with a torsion coil spring 124, which biases the lock lever 116 in a direction of engaging the cutout 122 with the striker 64.

In this fourth embodiment also, if the guide lever 52 is moved forwardly in the vehicle, then the cutout 122 of the lock lever 116 engages the striker 64 to retain the guide lever 52 in a locked condition, and, through the brake release operation of the parking brake lever 90, the guide lever 52 can be unlocked.

Figure 12:
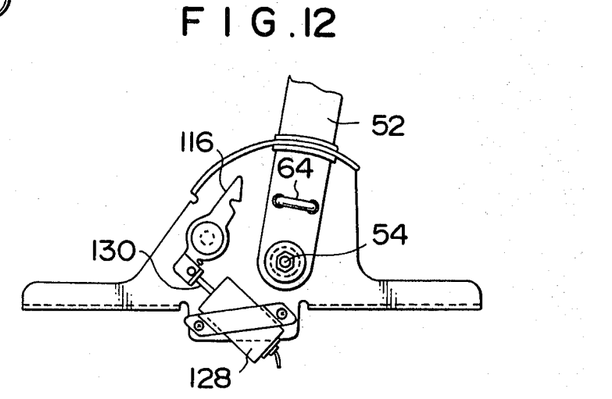
FIG. 12 is a side view of the locking device in a fifth embodiment of the present invention.
Figure 13:
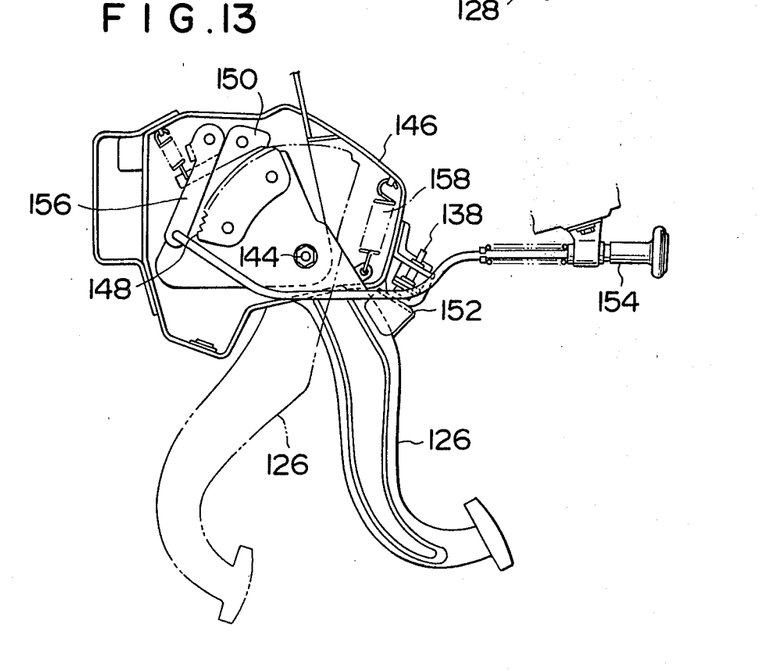
FIG. 13 is a side view showing the parking foot brake.
Figure 14:
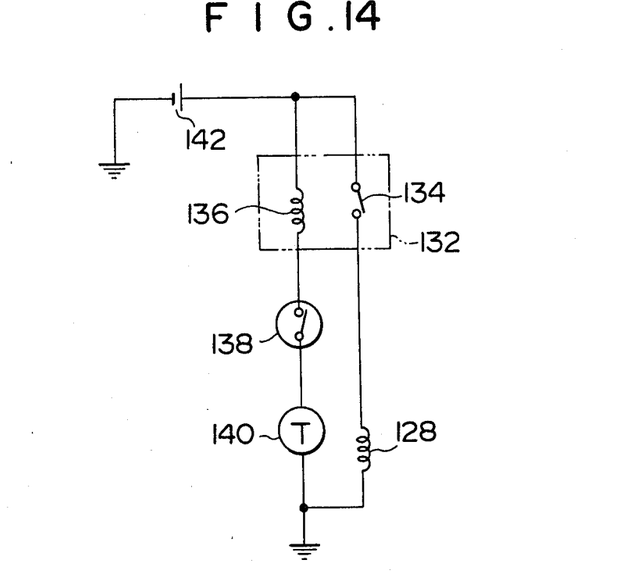
FIG. 14 is a circuit diagram of the fifth embodiment.

FIGS. 12 through 14 show a fifth embodiment of the present invention, in which the locking device is adapted to be unlocked by a parking foot brake 126.

More specifically, as shown in FIG. 12, the lock lever 116 of the locking device is engaged with a movable shaft 130 of a solenoid 128, which is excited by the operation of a relay 132 as shown in a circuit diagram in FIG. 14. A contact 134 of the relay 132 is adapted to be closed by the excitation of a relay coil 136, and a current from a vehicle power source 142 is supplied to the relay coil 136 only for the operating time of a timer 140 when a parking switch 138 is closed.

Here, as shown in FIG. 13, the foot brake 126 is pivotally supported by a pedal bracket 146 through a pin 144, turned by a depressing force of the occupant in the clockwise direction, whereby a ratchet gear 148 engages a pawl 150, so that a depressed state can be retained, thus resulting in a brake operating condition. In this brake operating condition, a working plate 152 welded to the foot brake 126 is separated from the parking switch 138, whereby the parking switch 138 is opened, and consequently, when the parking release knob 154 is pulled out, a release lever 156 receives this pulling force to separate the pawl 150 from the ratchet gear 148, whereby the parking foot brake 126 is turned by a biasing force of a coil spring 158 in the counterclockwise direction. While, in the brake released condition, the working plate 152 comes into contact with the parking switch 138 to close it.

Also in the fifth embodiment with the abovedescribed arrangement, when the guide lever 52 shown in FIG. 12 is moved by the manual operation forwardly in the vehicle, the striker 64 engages the lock lever 16, whereby the locking is retained, so that the occupant can readily enter or leave the vehicle. Furthermore, if the occupant pulls out the parking release knob 154 after he enters the vehicle, then the depressed state of the parking foot brake 126 is released, whereby the working plate 152 of the parking foot brake 126 closes the parking switch 138, so that the contact 134 of the relay 132 is closed for the setting time of the timer 140, thereby exciting the solenoid 128. As a result, the solenoid 128 turns the lock lever 116 to be separated from the striker 64, whereby the guide lever 52 is unlocked, so that the guide lever 52 is again moved by a tension of the webbing rearwardly in the vehicle, thereby enabling to reliably fasten the webbing to the occupant.

Figure 15:
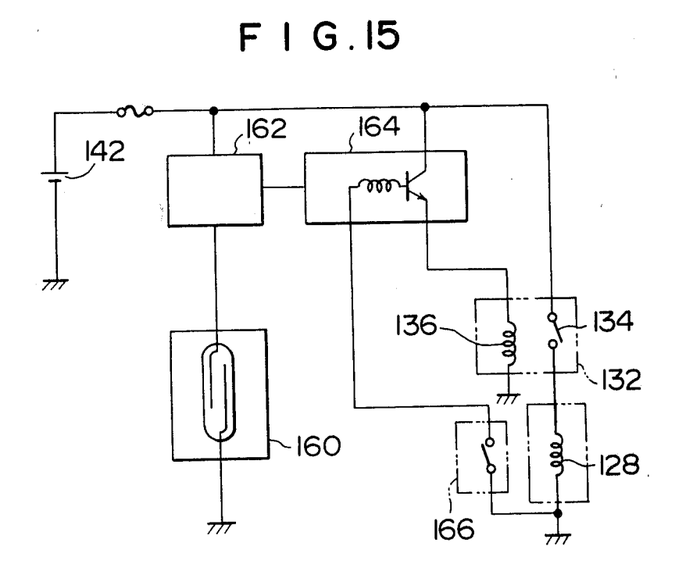
FIG. 15 is a circuit diagram of a sixth embodiment.

Next, FIG. 15 shows a circuit diagram used in a sixth embodiment of the present invention, in which the locking device is unlocked by a vehicle speed sensor 160.

When a predetermined speed (10 km/h, for example) is reached some time after the start of running of the vehicle, this vehicle speed sensor 160 is closed, whereby a voltage from the vehicle power source 142 is applied to a vehicle speed sensing circuit 162. By this, the vehicle speed sensing circuit 162 actuates a switching circuit 164 to supply a current to the relay coil 136, whereby the relay contact 134 is closed to excite the solenoid 128, so that the locking device is unlocked similarly to the preceding embodiment, thereby enabling to automatically bring the occupant into the seatbelt fastened condition before the vehicle enters into the normal running condition. In addition, this solenoid 128, when excited, is adapted to close a cancel switch 166, and this cancel switch 16 makes the relay coil 136 inoperative through the switching circuit 164 in a predetermined period of time so as to deenergize the solenoid 128.

As has been described hereinabove, in the automatic seatbelt system according to the present invention, a guide lever is used to move the webbing forwardly in the vehicle when the occupant enters or leaves the vehicle, so that such outstanding advantages can be offered that very comfortable automatic webbing fastening and unfastening actions are attainable.

What is claimed is:

1. An automatic seatbelt system wherein an occupant restraining webbing is suspendedly extended at least from a vehicle door to the substantially central portion of a vehicle through a position forwardly of an occupant's seat, and said webbing approaches or recedes from the seat in accordance with the opening or closing the door, comprising:
   (a) a guide lever provided at one side of said seat and formed at the forward end thereof with a loop, through which the intermediate portion of the webbing passes, said guide lever being moved by the manual operation forwardly in the vehicle to enlarge a space formed between the seat and the webbing;
   (b) a locking device for retaining said guide lever in a condition of being turned forwardly in the vehicle, to thereby prevent said guide lever from returning rearwardly in the vehicle; said locking device comprising a striker provided on said guide lever, a lock lever formed with a projection engageable with said striker in a locked condition, and a release lever formed with a projection engageable with said lock lever to retain said locked condition; and
   (c) release means for releasing the operation of said locking device before the vehicle enters the normal running condition, whereby the occupant is brought into a seatelt fastened condition by the returning movement of said guide lever.

2. An automatic seatbelt system as set forth in claim 1, wherein said striker is formed into a letter 'U' shape and solidly secured to said guide lever.

3. An automatic seatbelt system as set forth in claim 3, wherein said release means is adapted to unlock the locking device by brake releasing action of a parking brake lever.

4. An automatic seatbelt system as set forth in claim 1, wherein said release means is provided with a second release lever rotatable by brake releasing action of a parking brake lever, said second release lever imparting its rotation to said release lever of the locking device to unlock the locking device.

5. An automatic seatbelt system as set forth in claim 4, wherein rotation from said second release lever is imparted by a wire connecting the release levers to each other.

6. An automatic seatbelt system as set forth in claim 1, wherein said release means has a sensor for sensing that the running speed of the vehicle reaches a predetermined value, and the sensing operation of said sensor unlocks the locking device.

7. An automatic seatbelt system, wherein a restraining webbing is automatically fastened to an occupant after he is seated, comprising:
   (a) at lease one restraining webbing is suspendedly extended from a vehicle door to the substantially central portion of a vehicle with the intermediate portion thereof passing through a position forwardly of a seat;

(b) a bracket secured to the inner side of the seat;
(c) a guide lever pivotally supported by said bracket through a bolt, the axis of which is disposed laterally of the vehicle, rotatable back and forth in the vehicle, and rotatable by the manual operation forwardly in the vehicle;
(d) a webbing guide secured to the forward end of said guide lever and receiving the intermediate portion of the webbing, said webbing guide bending the intermediate portion of the webbing, when the guide lever is rotated forwardly in the vehicle, to enlarge a space formed between the webbing and the seat;
(e) a striker secured to the intermediate portion of said guide lever;
(f) a lock lever to be engaged with said striker, when said guide lever is rotated forwardly in the vehicle, to retain the condition of said guide lever being rotated forwardly in the vehicle;
(g) a first release lever to be engaged with a projection of said lock lever to retain the locking of the lock lever or to be disengaged from the projection of said lock lever to release the locking; and
(h) a second release lever connected to said first release lever through a wire and giving a tensile force to said wire by releasing action of a parking brake lever of the vehicle to separate said first release lever from said lock lever.

8. An automatic seatbelt system, wherein an occupant restraining webbing is suspendedly extended at least from a vehicle door to the substantially central portion of a vehicle through a position forwardly of an occupant's seat, and said webbing approaches or recedes from the seat in accordance with the opening or closing the door, comprising:
(a) a guide lever provided at one side of said seat and formed at the forward end thereof with a loop, through which the intermediate portion of the webbing passes, said guide lever being moved by the manual operation forwardly in the vehicle to enlarge a space formed between the seat and the webbing;
(b) a locking device for retaining said guide lever in a condition of being turned forwardly in the vehicle, to thereby prevent said guide lever from returning rearwardly in the vehicle; and
(c) release means for releasing the operation of said locking device before the vehicle enters the normal running condition, said release means unlocks the locking device by brake releasing action of a parking brake lever, whereby the occupant is brought into a seatbelt fastened condition by the returning movement of said guide lever.

9. An automatic seatbelt system, wherein an occupant restraining webbing is suspendedly extended at least from a vehicle door to the substantially central portion of a vehicle through a position forwardly of an occupant's seat, and said webbing approaches or recedes from the seat in accordance with the opening or closing the door, comprising:
(a) a guide lever provided at one side of said seat and formed at the forward end thereof with a loop, through which the intermediate portion of the webbing passes, said guide lever being moved by the manual operation forwardly in the vehicle to enlarge a space formed between the seat and the webbing;
(b) a locking device for retaining said guide lever in a condition of being turned forwardly in the vehicle, to thereby prevent said guide lever from returning rearwardly in the vehicle; and
(c) release means for releasing the operation of said locking device before the vehicle enters the normal running condition, said release means having a sensor for sensing that the running speed of the vehicle reaches a predetermined value, and the sensing operation of said sensor unlocks the locking device, whereby the occupant is brought into a seatbelt fastened condition by the returning movement of said guide lever.

10. An automatic seatbelt system wherein an occupant restraining webbing is suspendedly extended forwardly of an occupant's seat from a portion of a vehicle adjacent the exterior of a vehicle to a substantially central portion of a vehicle and said webbing approaches or recedes from a rearward position in which the occupant of the seat is restrained from abrupt forward movement to a forward position in which ingress and egress from the seat is facilitated, comprising:
lever means for moving said webbing forwardly of a seat; said lever means comprising means for pivoting and being manually pivotable from a rearward position correlating to the rearward position of said webbing to a forward position correlating to the forward position of said webbing, said lever means further comprising means for receiving said webbing by which an intermediate portion of said webbing is received, said lever means operating to move said webbing forwardly therewith when said lever means is moved forwardly thereby enlarging a space between a seat and said webbing to facilitate ingress and egress;
means for locking said lever means in said forward position to thereby prevent said lever means from returning to a rearward position;
means for releasing the operation of said locking means so as to permit return of said lever means to said rearward position, said releasing means including vehicle responsive means for activating said releasing means, said vehicle responsive means responds to the operation of a parking brake;
whereby when egress from a vehicular seat is desired, said lever means is manually moved forward by an occupant of a seat to a forward position where it is retained in place by said locking means and when an occupant is seated upon commencement of the normal running operation by an operator of the vehicle said vehicle responsive means activates said releasing means to allow said lever means to return to a rearward position.

11. An automatic seatbelt system wherein an occupant restraining webbing is suspendedly extended forwardly of an occupant's seat from a portion of a vehicle adjacent the exterior of a vehicle to a substantially central portion of a vehicle and said webbing approaches or recedes from a rearward position in which the occupant of the seat is restrained from abrupt forward movement to a forward position in which ingress and egress from the seat is facilitated, comprising:
lever means for moving said webbing forwardly of a seat; said lever means comprising means for pivoting and being manually pivotable from a rearward position correlating to the rearward position of said webbing to a forward position correlating to the forward position of said webbing, said lever means further comprising means for receiving said webbing by which an intermediate portion of said webbing is received, said lever means operating to move said webbing forwardly therewith when said lever means is moved forwardly thereby enlarging a space between a seat and said webbing to facilitate ingress and egress;

means for locking said lever means in said forward position to thereby prevent said lever means from returning to a rearward position;

means for releasing the operation of said locking means so as to permit return of said lever means to said rearward position, said releasing means including vehicle responsive means for activating said releasing means, said vehicle responsive means includes a sensor for sensing when the running speed of a vehicle has reached a predetermined value;

whereby when egress from a vehicular seat is desired, said lever means is manually moved forward by an occupant of a seat to a forward position where it is retained in place by said locking means and when an occupant is seated upon commencement of the normal running operation by an operator of the vehicle said vehicle responsive means activates said releasing means to allow said lever means to return to a rearward position.

* * * * *